United States Patent [19]

Yano

[11] Patent Number: 4,704,636
[45] Date of Patent: Nov. 3, 1987

[54] FACSIMILE APPARATUS

[75] Inventor: Satoshi Yano, Kawasaki, Japan

[73] Assignee: Ricoh Company, Ltd., Tokyo, Japan

[21] Appl. No.: 860,257

[22] Filed: May 6, 1986

[30] Foreign Application Priority Data

May 10, 1985 [JP] Japan .................................. 60-97870
May 10, 1985 [JP] Japan .................................. 60-97869

[51] Int. Cl.⁴ .............................................. H04N 1/23
[52] U.S. Cl. .................................... 358/280; 358/256;
358/257
[58] Field of Search ............... 358/257, 280, 243, 294,
358/256; 355/72, 75

[56] References Cited

U.S. PATENT DOCUMENTS 4,571,633 2/1986 Kondo .................................. 358/280
4,598,323 7/1986 Honjo .................................. 358/280

Primary Examiner—Michael A. Masinick
Attorney, Agent, or Firm—Oblon, Fisher, Spivak, McClelland, & Maier

[57] ABSTRACT

A facsimile apparatus of the type using recording papers in the form of sheets sized A5 which is smaller than a format A4. The apparatus in accordance with one embodiment includes a memory capable of storing an amount of picture signals which corresponds to an A5 document. When decoded picture signals have exceeded in amount the A5 format and the A5 sheets in the cassette have run down, the subsequent picture signals are written into the memory. In accordance with another embodiment, the apparatus includes a page memory capable of storing an amount of picture signals which corresponds to an A4 document. Decoded picture signals are once stored in the page memory. Immediately after one full page of picture signals have been stored, the feed of the paper is started. When the papers have run out as a result of the feed, transmission of subsequent pages is inhibited while the contents of the page memory are preserved. The apparatus is capable of receiving pictures of documents sized at least A4.

3 Claims, 3 Drawing Figures

FACSIMILE APPARATUS

BACKGROUND OF THE INVENTION

The present invention relates to a facsimile apparatus with which recording papers in the form of sheets of a format at least smaller than A4, e.g. A5, are usable.

A facsimile apparatus generally used has a construction which meets the standard specifications as recommended by CCITT (Consultative Committee of International Telegraph and Telephone). One of the specifications is that the apparatus be capable of receiving at least one full page of picture which is sized A4. Meanwhile, a facsimile apparatus is often used to send documents which are smaller in size than A4, as typified by slips of a format A5. This simetimes requires pictures to be directly received in the format A5.

Usually, a recorder installed in a facsimile apparatus includes a thermal head having an array of heat-generating elements each of which corresponds in dimensions to a pixel, the elements corresponding one-to-one to pixels in one complete line. Used with the thermal head is a roll of thermal paper which colors only in portions thereof to which heat is applied. In this type of recorder, the paper carrying a received picture is cut in a slightly larger size than a document transmitted after being discharged and, in addition, the cutting timing differs from one transmitting apparatus to another. Therefore, the resultant papers are irregularly dimensioned to make future filing work troublesome.

Although papers in the form of A5 sheets may be used to cope with the above problem, such brings about another problem that where only one paper is left a picture of an A4 format document cannot be recorded, contrary to the CCITT recommendation. While A4 sheets may be equipped with together with A5 sheets in order to implement reception of A4 documents, the above-stated problem still arises when no A4 sheets are left.

SUMMARY OF THE INVENTION

It is therefore an object of the present invention to provide a facsimile apparatus capable of surely receiving one full page of picture which is carried in a document of format A, a standard size as recommended by CCITT, and also capable of adequately receiving documents the format of which is smaller than A4, e.g. A5 slips.

It is another object of the present invention to provide a facsimile apparatus which is operable with an image storing unit having a minimum capacity.

It is another object of the present invention to provide a generally improved facsimile apparatus.

A facsimile apparatus of the present invention uses recording papers in the form of sheets of a predetermined size which are stored in a paper cassette and capable of receiving picture signals associated with an at least two times greater size than the predetermined size. The apparatus comprises a paper sensor for sensing whether or not the recording sheets are present in the cassette, a decision unit for determining that an amount of signals decoded has exceeded an amount which is associated with the predetermined size, a picture signal store having a capacity which accommodates an amount of picture signals associated with the predetermined size, and a control unit for, when the decision unit has produced as excess signal and the paper sensor has produced a paper end signal, causing subsequent decoded picture signals to be stored in the picture signal store.

In accordance with the present invention, a facsimile apparatus of the type using recording papers in the form of sheets sized A5 which is smaller than a format A4 is disclosed. The apparatus in accordance with one embodiment includes a memory capable of storing an amount of picture signals which corresponds to an A5 document. When decoded picture signals have exceeded in amount the A5 format and the A5 sheets in the cassette have run down, the subsequent picture signals are written into the memory. In accordance with another embodiment, the apparatus includes a page memory capable of storing an amount of picture signals which corresponds to an A4 document. Decoded picture signals are once stored in the page memory. Immediately after one full page of picture signals have been stored, the feed of the paper is started. When the papers have run out as a result of the feed, transmission of subsequent pages is inhibited while the contents of the page memory are preserved. The apparatus is capable of receiving pictures of documents sized at least A4.

The above and other objects, features and advantages of the present invention will become more apparent from the following detailed description taken with the accompanying drawings.

DESCRIPTION OF THE PREFERRED EMBODIMENTS

While the facsimile apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
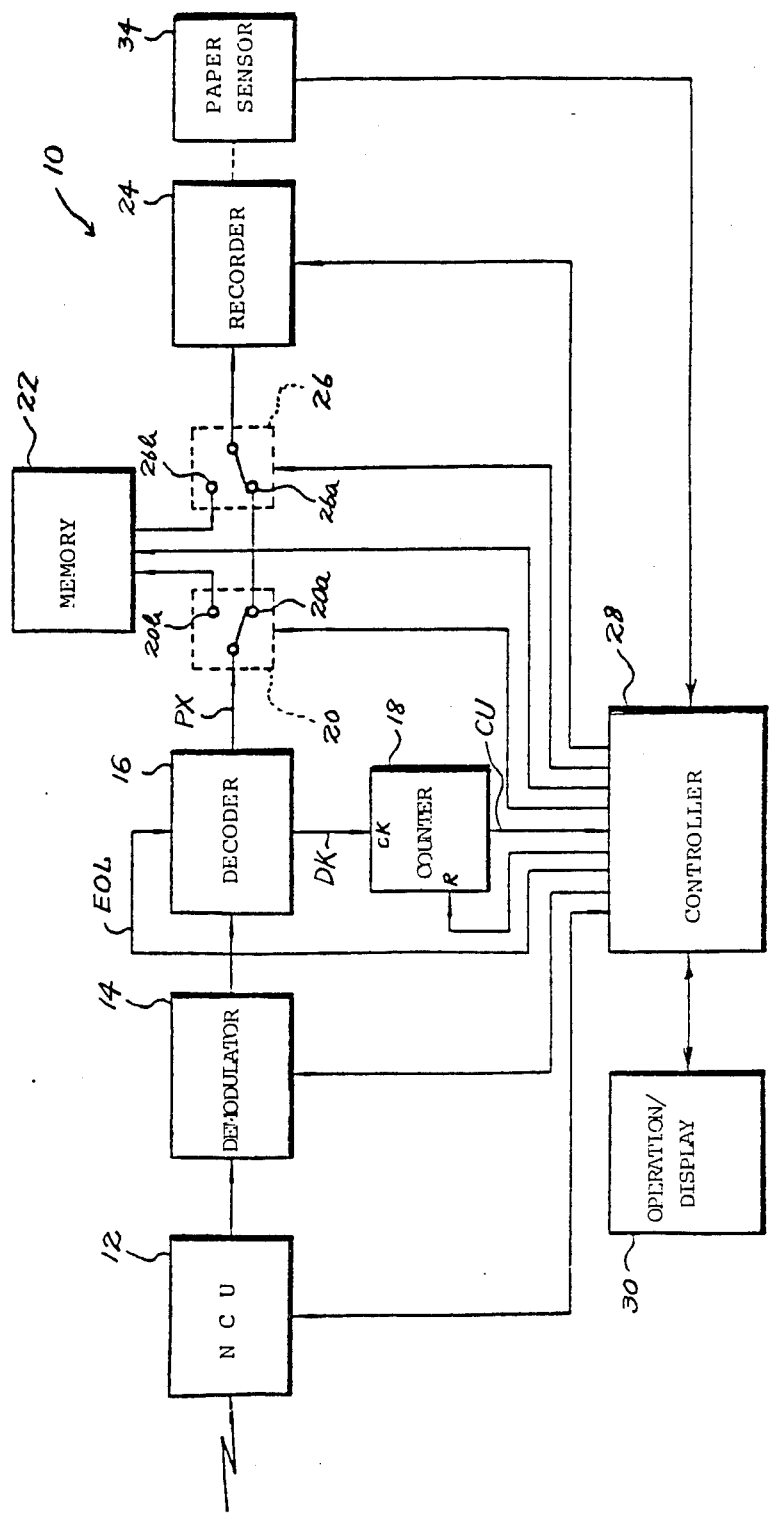
FIG. 1 is a block diagram of a facsimile apparatus embodying the present invention.

Referring to FIG. 1 of the drawings, a facsimile apparatus in accordance with the present invention is shown and generally designated by the reference numeral 10. Since this particular is related to a receiving system, the following description will concentrate to the receiving system.

As shown, a network control unit (NCU) 12 interfaces the apparatus 10 to a communication link which, in the illustrative embodiment, comprises a public telephone network. A signal received by the NCU 12 is applied to a demodulating unit 14 to be thereby restored to non-modulated picture data. The output of the demodulating unit, or demodulator, 14 is routed to a decoding unit 16 which then converts it to an original picture signal PX. The decoding unit, or decoder, 16 produces a count signal KD upon detection of an end-of-line signal, or line sync signal, EOL. The count signal DK is applied to a clock input terminal CK of a counter 18. Upon counting lines the number of which corresponds to the A5 format, the counter 18 generates a count-up signal CU. The picture signal PX from the decoder 16 is fed to a selector 20 which serves to selectively deliver the picture signal PX to a memory 22 and another selector 26. The store 22 has a capacity great enough to store an amount of picture signals PX which corresponds to the A5 format. The selector 26 is adapted to feed the picture signals PX outputted by the selector 20 and the output signal of the memory 22 selectively to a recording unit 24.

Figure 2:
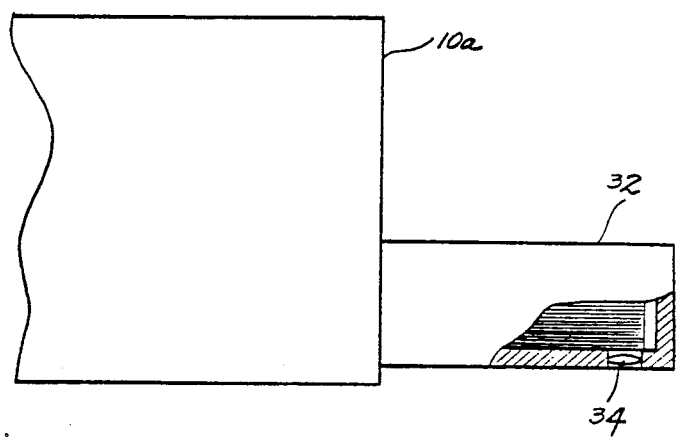
FIG. 2 is a schematic view of an example of paper cassette.

A control unit 28 controls the operations of the NCU 12, demodulator 14, decoder 16, selectors 20 and 26, recorder 24 and memory 22, while executing a data link control procedure. The control unit, or controller, 28 is supplied with an operation input signal which is entered by an operator through an operation and display unit 30, while in turn causing the unit 30 to display various kinds of messages meant for the operator. The recorder 24 is of the type using recording sheets of format A5 such as plain papers or thermal papers. As shown in FIG. 2, a paper cassette 32 loaded with the A5 papers is provided with a paper sensor 34 adapted to sense that the papers have run out. The output signal of the paper sensor 34 is applied to the controller 28. In FIG. 2, the paper cassette 32 is mounted in a housing 10 which is the housing of the apparatus 10. The paper sensor 34 is of a reflection type which uses infrared rays in order to eliminate the influence of ambient rays.

In operation, assume that the apparatus 10 has received a call. First, the NCU 12 informs the control 28 of the incoming call so as to cause it to set up mutual functions with a calling station by a pretransmission procedure. At the same time, if any paper has been sensed by the paper sensor 34, the controller 28 starts on a reception control. During the reception control, the controller 28 conditions the selectors 20 and 26 as illustrated to select their terminals 20a and 26a and, thereafter, activates the demodulator 14, decoder 16 and recorder 24. As a result, the received signal is converted to a picture signal which is then recorded by the recorder 24. In this condition, if the document transmitted is of the format A5, the counter 18 does not generate any count-up signal CU so that the controller 28 remains in the same state. Where a plurality of documents are sequentially transmitted, the controller 28 executes multi-page mode processing.

Assume that the documents transmitted are of the format A4. Then, the counter 18 produces a count-up signal CU before the transmission of the first document is completed. At this instant, the controller 28 checks the output of the paper sensor 34 to see if any paper is left in the cassette and, if the answer is positive, activates the recorder 24 again. Consequently, a complete picture of one full A4 document is recorded in halves in two A5 papers. Even a plurality of such documents will be received by the same control.

Further, assume that an A4 document has been transmitted when only one paper is left in the cassette 32 of the apparatus 10. First, one half of the document transmitted is recorded in the paper by the same procedure as described above. Thereafter, as the counter 18 produces a count-up signal CU, the controller 28 checks the output of the paper sensor 34 and, in this case, determines that no paper is left in the cassette 32. The controller 28 then switches the selector 20 to the other terminal 20b while enabling the memory 22 with the result that a picture signal representative of the other half of the document is written into the store 22 via the selector 20. Upon completion of the reception, the controller 28 reports the operator that an A4 document has been received and that the recording papers have run out during the reception. As the operator loads the cassette 32 with a supplementary amount of papers and then commands the controller 28 to output the remaining picture via the operation and display unit 30, the controller 28 selects the other terminal 26b of the selector 26 so as to read the picture signal out of the memory 22 and, at the same time, activates the recorder 24. As a result, a picture representative of the latter half of the A4 document is outputted by the recorder 24. In this manner, the apparatus 10 is capable of receiving at least one A4 document transmitted thereto.

While this particular embodiment has been shown and described as using A5 recording papers only, it is naturally operable with A4 recording papers.

As described above, the apparatus 10 is furnished with a memory whose capacity is sufficient to accommodate an amount of picture signals corresponding to a document sized A5, so that when the amount of decoded picture signals has exceeded that of an A5 document and recording papers in the forms of sheets have run out, subsequent picture signals are written into the memory. The apparatus 10, therefore, is allowed not only to adequately receive, for example, A5 slips but also to surely receive a picture of at least one A4 document which is larger than the recording sheets in size. In addition, such meets the previously stated CCITT specification.

Figure 3:
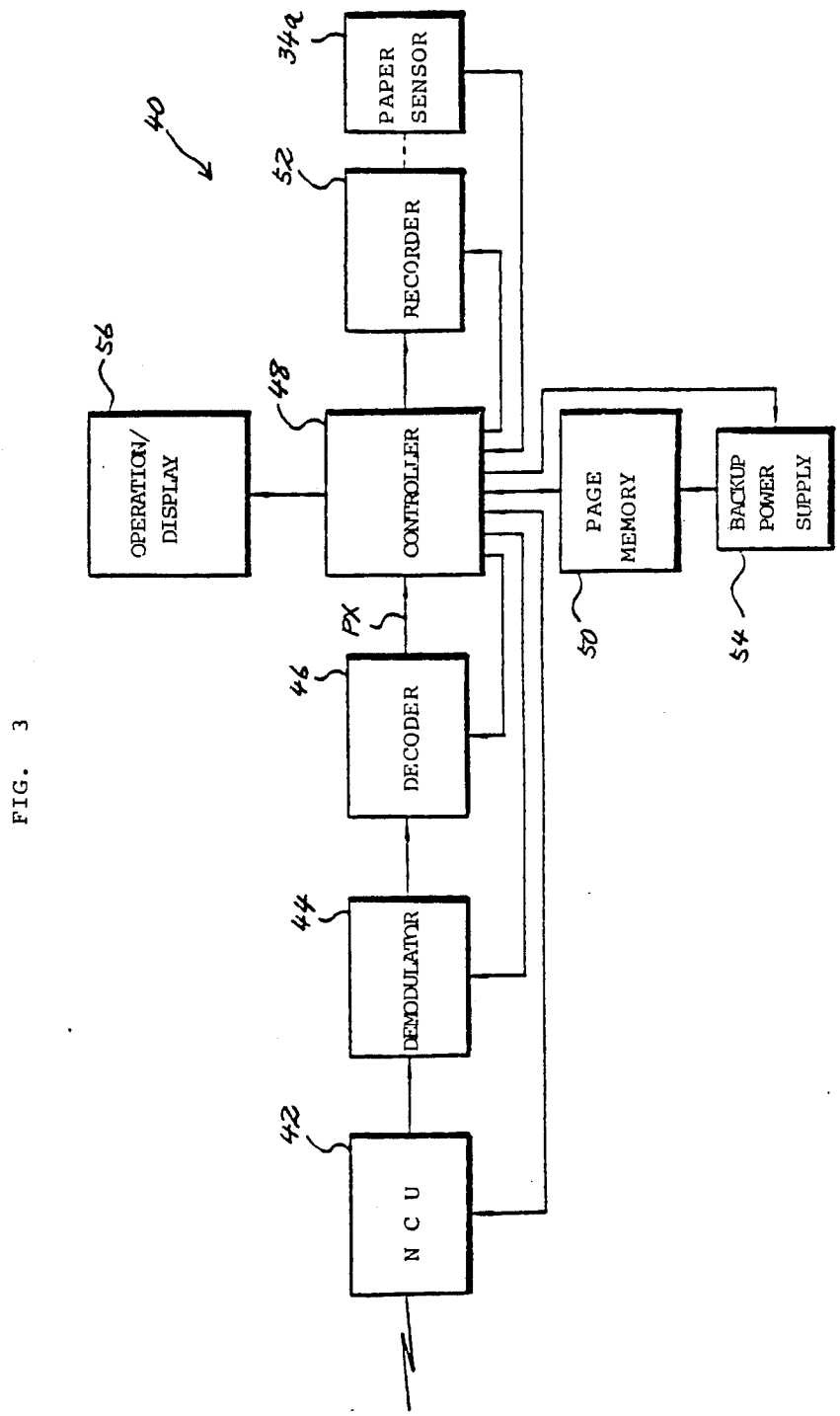
FIG. 3 is a block diagram showing another embodiment of the present invention.

Referring to FIG. 3, another embodiment of the present invention is shown. This embodiment, like the previous one, is related to a receiving system and, therefore, the following description will concentrate to the receiving system.

The facsimile apparatus, generally 40, is interfaced to a communication link which in the illustrative embodiment comprises a public telephone network by an NCU 42. A received signal outputted by the NCU 42 is applied to a demodulator 44 to by thereby restored to non-modulated picture data. The output signal of the demodulator 44 is converted by a decoder 46 to an original picture signal PX. The picture signal PX is temporarily stored in a page memory 50 whose capacity is great enough to accommodate a document of format A4. When picture signals PX representative of one full page of document have been written into the page memory 50, a controller 48 reads them out and applies them to a recorder 52 which then reproduces the document picture on a recording paper. The controller 48 controls the operations of the NCU 42, demodulator 44, decoder 46, page memory 50, recorder 52, and a backup power supply 54 which is adapted to hold the picture signals PX stored in the page memory 50. Another function fulfilled by the controller 48 is executing a data link control procedure.

An operation and display unit 56 serves as a man-machine interface for interfacing the apparatus 40 to the operator. An operation input signal is entered by the operator via the unit 56 while various kinds of messages are selectively displayed on the unit 56 as instructed by the controller 48. The recorder 52 comprises a thermal recorder with which thermal papers of format A5 in the form of sheets are usuable as recording media. In this particular embodiment, too, a paper cassette adapted to feed the papers is provided with a paper sensor 34a which is similar to the paper sensor 34 of FIG. 2, so as to sense that the cassette has been emptied. The output signal of the paper sensor 34a is routed to the controller 48.

Assume that the apparatus 40 with the above construction has received a call. First, the NCU 42 informs the controller 48 of the incoming call to cause it to set up various functions such as paper size and data signalling rate with a calling station by a pretransmission procedure, thereafter starting on a reception control. In the reception control, the controller 48 checks the output of the paper sensor 34a to see if any paper is left in the paper cassette and, if any paper is left, enables the demodulator 44 and decoder 46 to enter into a receiving operation. Consequently, the picture signal PX is written into the page memory 50. As soon as one full page of document has been received with all the picture signals PX stored in the page memory 50, the controller 48 activates the recorder 52 while sequentially delivering the picture signals PX from the page memory 50 to the recorder 52.

In the recorder 52, one paper is fed from the cassette 56 to a predetermined position. As the picture signals PX arrive at the recorder 52, they are sequentially printed out in the paper one line at a time with the paper fed stepwisely. In the meantime, the controller 48 constantly monitors the status of the output signal of the paper sensor 34a to determine whether or not the papers in the cassette have run out. When the papers have run out, the controller 48 sends a predetermined procedure signal to the transmitting station in order to terminate the transmission, thereby forcibly inhibiting the transmission.

Where the paper size set up by the pretransmission procedure is A5, for example, picture signals PX representative of one full page of document are written into a half area of the page memory 50. Upon completion of the storage, the signals PX are sequentially read out of the page memory 50 one line at a time and starting at the first address of the memory 50. If one or more papers have been left in the cassette at the instant when a paper has been fed to the recorder 52 and a multi-page mode has been set up, the controller 48 performs in parallel relation a processing for reading the signals PX out of the page memory 50 and a processing for sequentially writing the subsequently received picture signals PX in the page memory 50 starting at the emptied address. If desired, since the latter half area of the page memory 50 is empty, the next picture signal PX may be written into that area.

Assume that when a paper has been fed to the recorder 52 after storage of the picture signals PX the number of papers left in the cassette is zero and a multi-page mode is selected. In this instance, the page memory 50 is ready to accommodate two more pages of picture signals PX. Hence, subsequent two pages of picture signals PX received are written into the page memory 50 and, then, the picture transmission is forcibly terminated. Simultaneously, the backup power supply 54 is activated to preserve the data stored in the page memory 50. The controller 48 informs the operator through the operation and display unit 56 of the fact that the papers have run out during reception and picture signals PX which have not been recorded are present in the page memory 50. As the operator loads the cassette with a supplementary amount of papers, the controller 48 responds to the resultant output of the paper sensor 34a representative of presence of papers by enabling the recorder 52 and transferring the picture signals PX from the page memory 50 to the recorder 52, whereby images are reproduced by the recorder 52. It will be noted that the picture transmission may be inhibited immediately after the papers have run out.

Where the paper size selected by the pretransmission procedure is A4, for example, picture signals PX representative of one full page of document transmitted are sequentially stored in the page memory 50 and, upon completion of the storage, they are sequentially read out of the memory 50 one line at a time and starting at the first address of the memory 50. If one or more recording papers are left after the supply o a paper to the recorder 52 and a multi-page mode operation is under way, the controller 48 performs in parallel relation a processing for reading out the picture signals PX out of the page memory 50 and a processing for sequentially writing the subsequently received picture signals PX into the memory 50 starting at the emptied address. Further, as soon as an amount of picture signals PX associated with format A5 are fully transferred to the recorder 52, the controller 48 activates the recorder 52 again and, simultaneously, sequentially transfers the remaining picture signals PX to the recorder 52. As a result, the whole picture of an A4 document is reproduced in two A5 papers.

Assume that the papers in the cassette have run out when the first paper has been fed to the recorder 52 and a multi-page mode operation is under way. Then, any further picture transmission is forcibly and immediately inhibited and the backup power supply 54 is enabled to hold the data stored in the page memory 50. As the operator who is informed of the exhaustion of the cassette and the picture signals PX being stored in the page memory 50 supplies the cassette with papers, the output of the paper sensor 34a is turned to a state indicative of presence of papers so that the controller 48 drives the recorder 52 and, at the same time, transfers the picture signals PX from the page memory 50 to the recorder 52.

In this manner, the apparatus 40 is capable of receiving a picture of a document sized at least A4 satisfying the specification concerning the capability of receiving images of at least one A4 document, as recommended by CCITT.

While this embodiment has been shown and described as using A5 recording sheets only, use may of course be made of both of A5 recording sheets and A4 recording sheets.

As described above, the apparatus 40 in accordance with this embodiment includes a memory capable of storing an amount of picture signals corresponding to one A4 document, temporarily stores decoded picture signals in the memory, and starts feeding a paper at the instant when one full page of picture signals have been stored. When no paper is left in the cassette after the feed of the first paper, the apparatus 40 inhibits transmission of subsequent pages while preserving data stored in the memory, thus being capable of receiving a picture of at least a document sized A4. In short, the apparatus 40 can surely receive one full page of A4 document while adequately receiving A5 slips.

Various modifications will become possible for those skilled in the art after receiving the teachings of the present disclosure without departing from the scope thereof.

What is claimed is:

1. A facsimile apparatus using recording papers in the form of sheets of a predetermined size which are stored in a paper cassette and capable of receiving picture signals associated with an at least two times greater size than the predetermined size, comprising:

paper sensor means for sensing whether or not the recording sheets are present in the cassette;

decision means for determining that an amount of signals decoded has exceeded an amount which is associated with said predetermined size;

picture signal store means having a capacity which accommodates an amount of picture signals associated with said predetermined size;

control means for, when said decision means has produced an excess signal and said paper sensor has produced a paper end signal, causing subsequent decoded picture signals to be stored in said picture signal store means; and recording means for producing an image on said recording sheets substantially filling each recording sheet with an image.

2. A facsimile apparatus as claimed in claim 1, wherein said predetermined size is a size corresponding to a format A5.

3. A facsimile apparatus using recording papers in the form of sheet of a format A5 which are stored in a paper cassette, comprising:

paper sensor means for sensing whether or not the papers are present in the cassette;

picture signal store means having a capacity which accommodates picture signals corresponding to a format A4;

picture signal holding means for holding picture signals stored in picture signal store means; and control means for temporarily storing decoded picture signals in said picture signal store means, causing image recording means to start feeding the paper from the cassette at an instant when picture signals representative of one full page of document have been recorded, and when said paper sensor means has produced a paper end signal upon the feed of the paper inhibiting transmission of pictures representative of subsequent pages and, at the same time, enabling said picture signal holding means to hold picture signals which have been stored in said picture signal store means; and wherein said image recording means produces an image on each sheet indicative of that sheets percentage of the total image received.

* * * * *